United States Patent Office 3,591,338
Patented July 6, 1971

3,591,338
PREPARATION OF METAL NITRIDES
William O. Roberts, Wilmington, Del., assignor to E. I. du Pont de Nemours and Company, Wilmington, Del.
No Drawing. Filed June 5, 1968, Ser. No. 734,521
Int. Cl. C01b 21/06
U.S. Cl. 23—191                     4 Claims

ABSTRACT OF THE DISCLOSURE

The process for preparing nitrides of Group IV–B and Group V–B metals by reacting the metal halide with ammonia to form the metal amidohalide followed by decomposition in ammonia or nitrogen at up to 400° C. to form the metal nitrogen halide and decomposition in ammonia or nitrogen at 900 to 1200° C. to form the metal nitride, is improved by carrying out the decomposition steps in the presence of from 0.1 to 1 part by volume of hydrogen per part by volume of nitrogen or ammonia.

BACKGROUND OF THE INVENTION

This invention relates to a process for the preparation of the nitrides of Group IV–B and Group V–B metals and more particularly is directed to an improvement in the process for preparing such metal nitrides from the corresponding metal amidohalides, the improvement comprising decomposition in a nitrogen or ammonia atmosphere of the amidohalides to the nitrogen halides and the nitrogen halides to the nitrides in the presence of from 0.1 to 1 part by volume of hydrogen per part by volume of nitrogen or ammonia.

The preparation of amidohalides of Group IV–B and V–B metals by reaction of the metal halide with ammonia and then decomposition in the presence of nitrogen or ammonia of the amidohalide and its decomposition product the metal nitrogen halide to obtain the metal nitride is well known in the art. However, the product of prior art methods ordinarily contained significant amounts of halide impurities and tended to have a large particle size and small surface area due to sintering at elevated temperatures.

Use of hydrogen in the preparation of metal nitrides is also known to the art. See British Pat. No. 1,050,932. However, while the use of hydrogen there as a heat transfer agent assisted in preventing corrosion of reactor walls it was essential that the hydrogen be pre-heated to a temperature of at least 2500° C. which can be both costly and dangerous.

I have discovered that by carrying out the decomposition steps described above, in the presence of from 0.1 to 1 part by volume of hydrogen per part by volume of nitrogen or ammonia present, nitrides are prepared at temperatures below 1250° C. The nitrides thus prepared are characterized by a halogen content of less than 1 percent, an oxygen content normally less than 0.5 percent, an average crystallite size of 1 to 150 millimicrons as measured by X-ray line broadening, and a surface area of from 10 to about 100 square meters per gram as measured by nitrogen absorption. Such nitrides are particularly useful in the preparation of dense, fine-grained refractory compositions.

SUMMARY

In summary, this invention is directed to an improvement in the process of preparing nitrides of Group IV–B and Group V–B metals comprising the steps of (a) reacting the corresponding metal halide with ammonia to form the metal amidohalide, followed by (b) decomposing the metal amidohalide to the metal nitrogen halide at a temperature of from about 200 to 800° C. in the presence of ammonia or nitrogen and then (c) decomposing the metal nitrogen halide to the metal nitride at a temperature of from about 800 to 1200° C. in the presence of ammonia or nitrogen, the improvement comprising carrying out the decomposition steps (b) and (c) in the presence of from 0.1 to 1 part by volume of hydrogen per part by volume of nitrogen or ammonia. This invention is further directed to the nitrides produced by this improved process characterized by a halogen content of less than 1 percent, an oxygen content of less than 0.5 percent, an average crystallite size of 1 to 150 millimcrons and a surface of from 10 to 100 square meters per gram.

The process improvement of this invention provides a metal nitride characterized by a fine particle size and exceptional purity, at reduced cost and without the hazards involved in some prior art processes. The product is particularly well suited for use in preparing dense fine-grained refractories.

DESCRIPTION OF THE INVENTION

Reactants

The reactants suitable for use in the process of this invention are halides of the Group IV–B and Group V –B metals appearing on E. H. Sargent & Co.'s Periodic Table, ammonia or nitrogen, and hydrogen. These materials are available commercially in suitaby pure condition or they can be prepared by means known to the art.

Representative of suitable metal halides are titanium tetrachloride, titanium dichloride, titanium trichloride, titanium tetrabromide, titanium tetrafluoride, titanium tetraiodide, hafnium tetrachloride, niobium pentachloride, niobium pentafluoride, niobium pentabromide, tantalum pentachloride, tantalum pentafluoride, tantalum pentabromide, vanadium tribromide, vanadium dichloride, vanadium trichloride, vanadium tetrachloride, vanadium trifluoride, vanadium pentafluoride, zirconium tetrabromide, zirconium tetrachloride, zirconium tetrafluoride, and zirconium tetraiodide.

Reaction conditions

The reaction conditions generally used to prepare metal nitrides from the metal halides and ammonia or nitrogen are suitable for use in this process. Thus the metal halide is ordinarily reacted with ammonia or nitrogen at a temperature of below about 300° C. to form the corresponding metal amidohalide.

The amidohalide thus formed is ordinarily decomposed to the metal nitrogen halide at temperatures of from about 200° C. up to almost 800° with preferred temperatures ranging between 300 and 400° C. This decomposition step is carried out in the presence of ammonia or nitrogen to avoid depletion of the nitrogen content in the decomposition product. One of the difficulties ordinarily encountered during this step is some surface sintering of the metal nitrogen halide after appreciable ammonium halide evolution. This surface sintering impedes evolution of the halogen at the higher temperature decomposition and contributes to reduced surface area.

The final decomposition is ordinarily carried out at a temperature of from about 800 to 1200° C., and preferably about 900 to 1000° C. This decomposition is also carried out in the presence of nitrogen or ammonia for the same reason as above. In prior art processes the tendency during this final decomposition step was to form an increasingly thick nitride skin on the particle of metal nitrogen halide making it increasingly difficult to expel the remaining halide in the core.

The presence during the decomposition steps of from 0.1 to 1 part by volume of hydrogen per part by volume of nitrogen or ammonia materially reduces the disadvantages mentioned above. It is believed that the presence of hydrogen promotes some early nitride formation during decomposition of the amidohalide and that the presence of the nitride at this early stage inhibits grain growth during subsequent decomposition. In any event, it is clear that the presence of the above described amounts of hydrogen result in a nitride product possessing smaller amounts of halogen and oxygen impurities and with a larger surface area than are found in nitrides similarly prepared in the absence of the hydrogen.

It is preferred that the hydrogen be present in an amount ranging between 0.2 and 1 part by volume per part by volume of nitrogen or ammonia. It is also preferred that the hydrogen be present in an amount in excess of one mole per mole of Group IV–B or Group V–B metal present.

Nearly all of the metal halide starting materials, the addition compounds and the decomposition products are sensitive to both hydrolysis and oxidation and are preferably protected from hydrolyzing and oxidizing environments.

While the process of this invention is described basically as a fixed bed reaction, it will be apparent to those skilled in the art that more efficient techniques such as fluidized beds or pressurized reactions are equally suitable and are contemplated within the scope of this invention. Similarly, catalytic agents such as platinized alumina or radiation of appropriate wavelength can be used without departing from the concept of this invention.

Products

The products of this invention are characterized by their exceptional purity and fine particle size.

More particularly, the products of this invention are characterized as containing less than 1 weight percent halides and less than 0.5 weight percent oxygen as measured by standard chemical analysis. The preferred products of this invention contain less than 0.5 weight percent halide and less than 0.25 weight percent oxygen.

The products of this invention are further characterized as having an average crystallite size of between 1 and 150 millimicrons as measured by X-ray line-broadening techniques. The preferred products have an average crystallite size of between 10 and 150 millimicrons and most preferably between 15 and 25 millimicrons.

The products of this invention are also characterized as having a surface area of from 10 to 100 square meters per gram as measured by nitrogen absorption. Preferably the products have a surface area of between 25 and 100 square meters per gram.

Utility

The products of this invention find use in any application where fine-grained metal nitrides of high purity are desirable. Most notably they are useful in high temperature fabrication of nitride refractories having a combination of strength and hardness and suitable for cutting and shaping metal.

This invention is further illustrated by the following examples wherein parts and percentages are by weight unless otherwise noted.

EXAMPLE 1

Two hundred ninety parts of titanium tetrachloride are distilled directly into 3,675 parts of trichloroethylene contained in a four liter resin kettle under an atmosphere of nitrogen. The titanium tetrachloride dissolves in the solvent completely. The solution is then cooled with Dry Ice to about —70° C.

Liquid ammonia is added dropwise while stirring the solution. A total of 152 parts of liquid ammonia are added. As the ammonia is added, a yellow precipitate forms. After completion of the reaction the slurry is allowed to warm to room temperature. The precipitate is then filtered off under a protective atmosphere of nitrogen and stored under nitrogen.

Some of the precipitate is put in an alumina boat and placed in a 2 and ½ inch diameter quartz tube furnace under nitrogen.

A mixture of hydrogen and ammonia consisting of equal volumes of hydrogen and ammonia is passed through the tube at a rate of 1 and ½ liters per minute.

The temperature of the furnace is first raised to 325° C. and maintained for one hour at this temperature. During this time a deposit of ammonium chloride forms on the inside walls of the cooler sections of the quartz tube and the yellow precipitate darkens in color. At the end of this time the temperature is raised to 900° C. and maintained for one-half hour. The furnace is then cooled to room temperature, nitrogen is passed through the tube to remove residual hydrogen and ammonia and the boat containing the sample is removed under a protective atmosphere of nitrogen. The product consisting of a brown-black material is analyzed, and found to contain 0.32% by weight of chlorine and 20.3% by weight of nitrogen. The surface area, as measured by nitrogen adsorption, is found to be 58 square meters per gram. X-ray diffraction analysis shows the product to be TiN, with an average crystallite size of 16 millimicrons as calculated from the X-ray line breadth.

EXAMPLE 2

A portion of the yellow precipitate prepared in Example 1 by the reaction between ammonia and titanium tetrachloride is placed in the furnace and heated as in Example 1, except that the hydrogen and ammonia used are in the proportion of one volume of hydrogen to 5 volumes of ammonia. The product is recovered and characterized as in Example 1. The chlorine content is found to be 0.78% by weight and the nitrogen content is 21.2% by weight. The surface area by nitrogen adsorption is 44 square meters/gram. X-ray diffraction analysis shows the product to be TiN having an average crystallite size of 15 millimicrons.

What is claimed is:

1. In the process for preparing nitrides of Group IV–B and Group V–B metals, said nitrides having a particle size of 1 to 150 millimicrons and a halide content of less than 1.0 percent by weight, and said process being carried out without vaporizing nitrogen containing intermediate metal compounds by the steps of
   (a) reacting the corresponding metal halide with ammonia to form the metal amidohalide, followed by
   (b) decomposing the metal amidohalide to the metal nitrogen halide at a temperature of from 200 to 800° C. in the presence of ammonia or nitrogen, and then
   (c) decomposing the metal nitrogen halide to the metal nitride at a temperature of from about 800 to 1200° C. in the presence of ammonia or nitrogen, the improvement comprising carrying out the decomposition steps (b) and (c) in the presence of from 0.1 to 1 part by volume of hydrogen per part by volume of nitrogen or ammonia.

2. The process of claim 1 wherein the hydrogen is present in an amount of from 0.2 to 1 part by volume per part by volume of nitrogen or ammonia.

3. The process of claim 1 wherein the metal halide is titanium tetrachloride, the decomposition step (b) is run at 300 to 400° C. and the decomposition step (c) is run at 900 to 1000° C.

4. The process of claim 3 wherein the hydrogen is present in an amount of from 0.2 to 1 part by volume per part by volume of nitrogen or ammonia.

References Cited

UNITED STATES PATENTS

| | | | |
|---|---|---|---|
| 2,413,778 | 1/1947 | Olson | 23—191 |
| 2,672,400 | 3/1954 | Jacobsen | 23—191 |
| 3,032,397 | 5/1962 | Niederhauser | 23—191 |
| 3,253,886 | 5/1966 | Lamprey et al. | 23—191X |
| 3,345,134 | 10/1967 | Heymer et al. | 23—191 |

OTHER REFERENCES

Van Arkel, Chem. Abstr., vol. 19, p. 1359 (May–September 1925).

OSCAR R. VERTIZ, Primary Examiner

C. B. RODMAN, Assistant Examiner